United States Patent
Henninger et al.

(10) Patent No.: US 11,428,265 B2
(45) Date of Patent: Aug. 30, 2022

(54) PLAIN BEARING AND METHOD FOR ITS MANUFACTURE

(71) Applicant: AKTIEBOLAGET SKF, Gothenburg (SE)

(72) Inventors: Frank Henninger, Grafenrheinfeld (DE); Stefan Keller, Schweinfurt (DE); Andreas Vierling, Schwebheim (DE)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 17/064,177

(22) Filed: Oct. 6, 2020

(65) Prior Publication Data

US 2021/0123477 A1    Apr. 29, 2021

(30) Foreign Application Priority Data

Oct. 24, 2019    (DE) .......................... 102019216423.4

(51) Int. Cl.
*F16C 23/04*    (2006.01)
*F16C 33/10*    (2006.01)
(Continued)

(52) U.S. Cl.
CPC ........ *F16C 33/102* (2013.01); *F16C 33/1095* (2013.01); *F16C 33/121* (2013.01);
(Continued)

(58) Field of Classification Search
CPC .. F16C 11/0676; F16C 23/043; F16C 23/045; F16C 33/102; F16C 33/121; F16C 33/124; F16C 33/1095; F16C 33/201; F16C 33/205; F16C 33/208; F16C 33/74; F16C 43/02; F16C 2202/50; F16C 2202/52; F16C 2202/54; F16C 2204/52; F16C 2208/36; F16C 2208/40; F16C 2208/58; F16C 2220/70; C09D 5/08; C09D 7/61;
(Continued)

(56) References Cited

U.S. PATENT DOCUMENTS 8,944,690 B2 *  2/2015 Natu ..................... F16C 33/201
                                                              384/276
2003/0095729 A1 *  5/2003 Post .................... F16C 33/1065
                                                              384/213
(Continued)

FOREIGN PATENT DOCUMENTS

CN        201053376 Y   *  4/2008
CN        106089995 A   *  11/2016
(Continued)

OTHER PUBLICATIONS

DE102013202824desc_machine translation.*
DE102013226749desc_machine translation.*
DE4130688desc_machine translation.*

*Primary Examiner* — Phillip A Johnson
(74) *Attorney, Agent, or Firm* — J-Tek Law PLLC; Scott T. Wakeman; Mark A. Ussai (57) ABSTRACT

A newly built plain bearing has an inner ring and an outer ring each having a sliding surface along which the rings are movable relative to each other. The sliding surfaces are spaced from each other by an intermediate space that holds an initial greasing, and at least one of the sliding surfaces includes an anti-corrosion coating.

18 Claims, 3 Drawing Sheets

(51) Int. Cl.
*F16C 33/74* (2006.01)
*F16C 33/12* (2006.01)

(52) U.S. Cl.
CPC .......... *F16C 33/74* (2013.01); *F16C 2202/52* (2013.01); *F16C 2202/54* (2013.01); *F16C 2208/58* (2013.01); *F16C 2220/70* (2013.01)

(58) Field of Classification Search
CPC . C09D 7/65; C10M 169/00; C10M 2201/085; C10M 2201/87
USPC .................. 384/203, 206, 286, 322; 508/181
See application file for complete search history.

(56) References Cited

U.S. PATENT DOCUMENTS

| | | | |
|---|---|---|---|
| 2013/0287326 A1* | 10/2013 | Porter | F16C 23/046 384/322 |
| 2015/0275125 A1* | 10/2015 | Karaki | C08F 220/34 384/300 |
| 2018/0363704 A1* | 12/2018 | Coombe | F16C 33/1065 |

FOREIGN PATENT DOCUMENTS

| | | | | | |
|---|---|---|---|---|---|
| CN | 206338323 | U | * | 7/2017 | |
| CN | 109163784 | A | * | 1/2019 | |
| CN | 110409293 | A | * | 11/2019 | |
| CN | 209941481 | U | * | 1/2020 | ............. E01D 19/04 |
| CN | 110159655 | B | * | 5/2020 | ............. F16C 23/043 |
| DE | 4130688 | A1 | * | 5/1993 | ............. F16C 33/201 |
| DE | 102013202819 | A1 | | 8/2014 | |
| DE | 102013202820 | A1 | | 8/2014 | |
| DE | 102013202821 | A1 | | 8/2014 | |
| DE | 102013202822 | A1 | | 8/2014 | |
| DE | 102013202823 | A1 | | 8/2014 | |
| DE | 102013202824 | A1 | | 8/2014 | |
| DE | 102013202824 | A1 | * | 8/2014 | ............. F16C 33/102 |
| DE | 102013202826 | A1 | | 8/2014 | |
| DE | 102013202828 | A1 | | 8/2014 | |
| DE | 102013202829 | A1 | | 8/2014 | |
| DE | 102013226749 | A1 | * | 6/2015 | ............. F16C 33/125 |
| DE | 102014107036 | A1 | * | 11/2015 | ............. F16C 23/045 |
| DE | 102019108182 | A1 | * | 10/2019 | ............. C08F 259/08 |
| DE | 102019129271 | B3 | * | 6/2020 | ............. F16C 43/02 |
| JP | 2011007207 | A | * | 1/2011 | ............. F16C 33/74 |
| JP | 2017219127 | A | * | 12/2017 | |
| JP | 2019019892 | A | * | 2/2019 | |
| KR | 20090036679 | A | * | 4/2009 | |
| WO | WO-9920913 | A1 | * | 4/1999 | ............. F16C 33/74 |
| WO | WO-2006009175 | A1 | * | 1/2006 | ............. E02F 9/006 |
| WO | WO-2007000275 | A1 | * | 1/2007 | ............. F16C 33/74 |
| WO | WO-2020020397 | A1 | * | 1/2020 | ............. F16C 33/14 |
| WO | WO-2020114538 | A1 | * | 6/2020 | ............. F16C 33/121 |

* cited by examiner

PLAIN BEARING AND METHOD FOR ITS MANUFACTURE

CROSS-REFERENCE

This application claims priority to German patent application no. 10 2019 216 423.4 filed on Oct. 24, 2020, the contents of which are fully incorporated herein by reference.

TECHNOLOGICAL FIELD

The present disclosure is directed to a newly built plain bearing and to a method for manufacturing such a plain bearing.

BACKGROUND

Plain bearings are used in many fields of technology wherein individual parts, subassemblies, or components move with respect to other parts, components, or systems. Plain bearings permit a corresponding relative movement of the respective components with respect to one another. For example, plain bearings can permit a rotation or oscillation about an axis, a linear movement along a movement direction, and/or a pivoting of one component relative to another, in each case with a relatively low amount of friction.

Plain bearings are used in particular as spherical plain bearings, for example, radial spherical plain bearings and rod ends. With such spherical plain bearings not only is a relative movement of the components with respect to one another made possible, but also a force or a moment can be transferred along via the spherical plain bearing from one component to the other component. However, the radial steel/steel spherical plain bearings preferably used here require a regular relubrication of the sliding surfaces of the plain bearing in order to achieve a predetermined service life.

However, precisely due to the often-occurring need for relubrication, the use of corresponding radial spherical plain bearings, rod ends, or other plain bearings can introduce additional problems or challenges with respect to design, construction, maintenance, and operation. In the prior art a plain bearing has therefore been proposed having an initial greasing that is already introduced into the bearing during manufacture, so that due to the initial greasing a relubrication during the service life of the bearing is unnecessary.

However, although disadvantages with respect to design, construction, maintenance, and operation can be avoided with the initial greasing, it is disadvantageous that due to the lack of relubrication, with which corrosion-inhibiting additives are introduced into the bearing, a sufficient corrosion protection cannot be ensured over the service life of the plain bearing, or corrosion that occurs during use reduces the service life of the plain bearing. In addition, with an in initial lubrication the protective effect from a grease collar is omitted; the grease collar forms with regular relubrication and thus protects against penetration of dirt and corrosion-promoting media.

SUMMARY

It is therefore an aspect of the present disclosure to provide a plain bearing that is low-maintenance, versatile in use and installation, and that has a long service life.

In the following a newly built plain bearing or a newly built spherical plain bearing is presented. In the sense of this application, a "newly built" plain bearing/spherical plain bearing is to be understood as a plain bearing/spherical plain bearing that was not yet in operation or is not yet installed or is in an unused state or has never been operated under load. Such a plain bearing/spherical plain bearing is usually manufactured in a production facility and then delivered to the corresponding point of use as a newly built plain bearing/spherical plain bearing. In particular, the newly built plain bearing/spherical plain bearing thus exhibits, ex works, when it leaves a manufacturing facility, the properties described below.

For the sake of readability, in the following only the general term "plain bearing" is used. However, all properties described can also be used directly with the specific design of the plain bearing as a spherical plain bearing.

The newly built plain bearing includes an inner ring and an outer ring, and the inner ring and the outer ring each include a sliding surface along which the inner ring and the outer ring are movable relative to each other. Between the sliding surface of the inner ring and the sliding surface of the outer ring an intermediate space is formed and into which an initial greasing is introduced. Here the initial greasing is preferably introduced at the factory.

In order to ensure or even increase the service life of a bearing, even the service life of an initially greased plain bearing, at least one of the sliding surfaces includes an anti-corrosion coating. Corrosion is notoriously one of the factors that limits the service life of a plain bearing. While corrosion is initially prevented by the initial greasing known from the prior art, this initial greasing is, however, not sufficient over the service life of the plain bearing to adequately prevent corrosion. As mentioned above, with non-initially-lubricated bearings, corrosion-inhibiting additives are usually introduced into the lubricant during the relubrication so that the service life is ensured. However, such additives are consumed over time, and furthermore cannot be added to initial greasing, since the compositions of initial greasing and the grease used during relubrication differ significantly. In addition, initially greased plain bearings that are not subsequently relubricated will not form a so-called grease collar, which forms with regular relubrication, and thus protects against penetration of dirt and corrosion-promoting media.

However, the additional anti-corrosion coating applied to at least one sliding surface ensures that even an initially greased plain bearing is protected against corrosion over its entire service life.

According to one preferred exemplary embodiment, the anti-corrosion coating is a coating including an anti-friction lacquer. While such anti-friction lacquers are known from the prior art, when they are used in a plain bearings, and in particular in spherical plain bearings, they achieve only very short service lives. However, the combination of anti-friction coating and initial greasing surprisingly leads to synergistic effects, and thus to a significant improvement of the corrosion protection, and specifically beyond an extent that would have been expected by the mere summation of the two.

According to one preferred exemplary embodiment, such an anti-friction lacquer includes, for example, a resin matrix including tribologically active additives, in particular embedded solid lubricant. Here PTFE and/or molybdenum disulfide and/or graphite can preferably be used as solid lubricant. The embedded solid lubricant ensures optimal tribological properties, while the resin matrix seals the surface of the anti-friction coating and thus contributes to an increase of the corrosion protection.

Alternatively or additionally, the anti-corrosion coating comprises a chemical nickel layer, in particular a nickel-phosphorus layer, and/or a polymer coating, in particular a coating including polyether ether ketone (PEEK), polyether sulfone (PES), polyphenylene sulfide (PPS), polyimide (PI), polyamide-imide (PAI), polybenzimidazole (PBI), and/or PTFE. These anti-corrosion coatings are also sufficiently hard and wear-resistant to ensure, in combination with the initial greasing, an optimized corrosion protection, and simultaneously that the tribological properties of the plain bearing are not reduced.

A further increase of the corrosion protection, a friction reduction, and/or a wear reduction can be achieved by providing at least part of the inner ring and/or the outer ring with a phosphate layer, in particular a manganese phosphate layer. For this purpose the sliding surface is phosphated by being subjected to an aqueous phosphate solution, for example, by an immersion, a spraying, a coating, and/or a flooding of the sliding surface or of the associated bearing ring. In addition, a certain porosity generated by the phosphating, an accumulating or adhering of the anti-corrosion coating, in particular of the anti-friction coating, can be improved.

Here a manganese phosphate solution is advantageously provided as an aqueous phosphate solution, which preferably has a pH value between approximately 1 and approximately 3, for example, between 1.4 and approximately 1.6, and a temperature between 50° C. and approximately 100° C., for example, of approximately 75° C. to approximately 95° C. The exposure of the sliding surface here can encompass a time span between approximately 1 min and approximately 30 min, for example, of approximately 5 min to approximately 15 min. A corresponding manganese phosphate layer can thereby be formed using relatively technically simple means.

According to a further advantageous exemplary embodiment, the initial greasing includes a grease paste that comprises at least one white solid lubricant having an overall proportion of between approximately 5% by weight and approximately 40% by weight. This further reduces wear of a plain bearing, and thus further reduces the relubrication requirement, or to increase the service life and/or load capacity of the plain bearing.

Here the at least one white solid lubricant can include an inorganic compound in the form of smooth, soft particles that do not act abrasively, or at least not significantly, so that the friction is reduced and wear on or damage to the plain bearing by abrasive particles is avoided. The white solid lubricant advantageously comprises at least one phosphate, a diphosphate, a hydroxide, or a borate of a metallic element, for example, of zinc or calcium. Thus the at least one white solid can, for example, comprise a calcium/zinc compound (CaZn compound). Additionally or alternatively the grease paste can further comprise a synthetic oil. Also additionally or alternatively the grease paste can belong to the NLGI consistency class 2 according to DIN 51818:1981.12. It can thereby also optionally be possible to more specifically adapt the grease paste or the solid lubricant to its later application and thus reduce the friction.

According to a further advantageous exemplary embodiment, the plain bearing furthermore includes at least one seal that covers the intermediate space between the sliding surfaces of the inner ring and of the outer ring, and is disposed such that the initial greasing is held in the intermediate space. The seal ensures that even during transport from the factory to a point of use, intermediate storage, customers, the initial greasing remains in the intermediate space. In addition, during transport and during use, the seal ensures that no foreign particles and contaminants that could damage the bearing can penetrate into the intermediate space.

The seal is usually connected to the inner ring or outer ring such that the seal and the inner ring or outer ring rotate together, and abuts on the respective other bearing ring. The seal itself can comprise an elastomer structure that includes at least one seal lip that is oriented essentially parallel or essentially radially to a common center point, which is disposed and oriented such that at least one seal lip abuts against the other bearing ring. It is thereby possible to prevent an escape of the lubricant, i.e., for example, of the initial greasing from the intermediate space between the inner ring and the outer ring, even with mechanically strong loads and movements of the inner ring toward the outer ring. It is of course also possible to use more than one seal lip, so that an abutting of at least one of the seal lips is ensured.

Furthermore, the at least one seal can comprise a stiffening structure that is mechanically or materially connected to the elastomer structure. The abutting of at least one of the three seal lips against the other bearing ring can thereby be ensured even with mechanically higher loads or movements of the inner ring toward the outer ring, so that the intermediate space is reliably sealed.

The stiffening structure can be formed from a metallic material, for example, a steel plate. Furthermore, the stiffening structure can comprise at least one first section and a second section mechanically connected, indirectly or directly, to the first section, which enclose an angle of at least 60° and at most 120° to each other. It is thereby possible that even with tilting of the inner ring with respect to the outer ring, as can occur in particular in spherical plain bearings, the seal abuts against the other bearing ring.

The elastomer structure preferably comprises an elastomer, for example, nitrile rubber (such as NBR=nitrile butadiene rubber). The elastomer can be connected to the optional stiffening structure in material-bonded, interference fit, and/or friction-fit manner. The elastomer structure can, for example be vulcanized onto the stiffening structure.

Another aspect of the present disclosure is a newly built spherical plain bearing comprising an unused inner ring, and an unused outer ring. The inner ring and the outer ring each include a sliding surface along which the inner ring and the outer ring are movable relative to each other, and an intermediate space exists between the sliding surface of the inner ring and the sliding surface of the outer ring. An initial greasing is provided in the intermediate space, and at least one of the sliding surfaces is coated with an anti-corrosion coating. As used herein "unused" refers to the condition of the bearing rings before they have been installed for use and subjected to the operating conditions and/or loads for which the bearing is designed.

A further aspect of the present disclosure relates to a method for manufacturing an above-described newly built plain bearing including an inner ring and an outer ring, wherein the inner ring and the outer ring each include a sliding surface along which the inner ring and the outer ring are movable relative to each other, wherein the method comprises the following steps:

providing an inner ring and an outer ring made of a starting material, grinding the rings in order to form at least one sliding surface of the inner ring and a sliding surface of the outer ring in a preliminary step, applying an anti-corrosion coating onto at least the sliding surface of the inner ring and the sliding surface of the outer ring, assembling the inner ring and the outer ring such that an intermediate space remains between the sliding surface of the inner ring and the sliding surface of the outer ring, introducing an initial greasing into the intermediate space.

As described above, due to the combination of initial greasing and anti-corrosion coating a bearing can be provided wherein on the one hand the requirement for a relubrication is reduced or completely unnecessary, and on the other hand the service life of the bearing is extended since it is ensured that the bearing has long-term corrosion protection. Here it is preferred in particular when the intermediate space is sealed by a seal, so that an escape of the initial greasing out of the intermediate space or an entry of contaminants into the intermediate space is prevented.

Iron or steel, for example, in particular a rolling-element bearing steel, can be used as starting material. Furthermore, the wear behavior of at least one of the bearing rings, i.e., for example, of the inner ring and/or of the outer ring, can optionally be improved by a corresponding hardening method. During hardening the bearing ring is at least partially heated and subsequently quenched in order to influence the microstructure and thus the hardness. By corresponding choice of the hardening process or of the parameters of the hardening process, a martensitic microstructure and/or a bainitic structure can be set, for example. Thus with such a method the bearing ring can be held at a temperature between approximately 720° C. and approximately 1100° C., for example, at a temperature between 850° C. and approximately 870° C., over a predetermined time span. A subsequent quenching can be effected, for example, to a temperature of approximately 10° C. to approximately 200° C., for example, to a temperature of approximately 50° C. to approximately 130° C. wherein, for example, the bearing ring is immersed in an oil bath. Depending on the chosen temperature with heating, or temperature gradient during quenching, it is possible to achieve various degrees of hardness with a high reproducibility.

Hardnesses of 50 to 64 HRC, for example, of 58 to 62 HRC, in a range according to scale C of DIN EN 6508-1: 2005 are particularly advantageous for the sliding surface of the inner ring or outer ring. The above-mentioned hardness values can be present in a complete bearing ring or only in a region thereof. Thus, for example, the specified hardnesses can be present only in a region below a surface of the bearing ring. Depending on the specific implementation, this can apply, for example, for a depth of at least 0.5 mm or at least 1 mm in a region of the surface of the bearing ring.

In the newly built plain bearing, the outer ring and inner ring can have different hardness values that are due to tolerances with respect to the process control, the starting materials, or other parameters.

However, it is also possible to provide a precise hardness difference between the inner ring and the outer ring. The inner ring and the outer ring can thereby optionally be designed more specifically for their later use purpose or their to-be-expected loads. The hardness difference can be at least 2 HRC levels, at least 3 HRC levels, at least 4 HRC levels, or at least 5 HRC levels. According to one exemplary embodiment, depending on the specific implementation of such a method and of a corresponding plain bearing it can optionally be advisable to also limit the hardness difference upward, for example to at most 10 HRC levels, at most 9 HRC levels, at most 8 HRC levels, at most 7 HRC levels, at most 6 HRC levels, or at most 5 HRC levels. Thus in the interest of a service life extension it can optionally be advisable to not allow the hardness difference between the inner ring and the outer ring to increase too greatly.

The grinding of the sliding surfaces can comprise a honing or cross-grinding. In the honing a honing cup wheel having a grain size of at least approximately 200, for example, a grain size in the range between 320 and approximately 600 is preferably used, wherein a honing oil can also be used. During honing the bearing ring preferably performs a continuous rotational movement, and the honing wheel performs an oscillating movement. Here the oscillatory or oscillating movement of the honing wheel and the rotational movement of the bearing ring have a period wherein a period of the rotational movement corresponds to exactly one complete revolution of the bearing ring. Here the periods by which the bearing ring is rotated and by which the honing disc executes the oscillating movement can have an integer ratio, or an inverse proportional integer ratio, a fractional rational ratio, or also a non-rational or irrational ratio. If the periods have an integer ratio or an inverse proportional integer ratio, then the patterns that arise during the honing return to one another or into one another after the course of the longer of the two periods. In the case of a fractional rational ratio this occurs only after a plurality of corresponding periods, while in the case of an irrational ratio, in the ideal case, or purely theoretically, is never the case. In practice an irrational ratio can of course be approximated by a correspondingly selected rational ratio. Here changes to the bearing ring or the honing wheel that can possibly arise due to the mechanical interaction of the two are ignored.

Due to the honing it is possible to achieve an improvement of the surface smoothness, or an improvement of the contour of the surface of the sliding surfaces of the inner ring or of the outer ring. Here the at least one sliding surface of the inner ring can be better adapted to the at least one sliding surface of the outer ring or vice versa with respect to their geometric design in order to thus achieve a smaller maximum surface pressure that can in turn lead to a reduction of the maximum occurring load.

For grinding the at least one sliding surface, a cross-grinding can also be considered using a cup wheel having a grain size of at least approximately 200, for example, a grain size in the range between approximately 320 and approximately 600, wherein a water-based grinding emulsion is optionally used. During cross-grinding of the at least one sliding surface, the bearing ring and the cup wheel each perform a continuous rotational movement. Here the rotational axes of the bearing ring and of the cup wheel cannot be aligned colinearly, i.e., can have a finite angle to each other that is different from 0°, i.e., for example, 90°. However, the angular speeds or rotational speeds of the cup wheel and of the sliding surface can generally be selected as desired. These can be selected, for example, such that one complete rotation of the bearing ring corresponds to exactly one complete rotation of the cup wheel. However, it is also possible to rotate the cup wheel at a higher or lower speed than the bearing ring so that one revolution of the cup wheel corresponds to more or less than one revolution of the bearing ring. Here a ratio of the corresponding rotational speeds can be integer or inversely proportional to a whole number, fractionally rational, or not-rational or irrational. In the case of an integer or inverse-integer ratio the grinding tracks thus return into themselves again after one revolution, while with fractionally rational ratios this can be the case after more than one revolution. In the case of irrational or not-rational rotational speed ratios, which can optionally be approximated by correspondingly fractionally rational ratios, in the ideal case the individual grinding tracks do not return into one another.

In a further optional method step the ground sliding surfaces can be subjected to an aqueous phosphate solution, for example, by an immersing, a spraying, a coating, and/or a flooding of the ground bearing ring. It can thereby also be possible to protect the blanks or the inner ring and or the outer ring even better with respect to corrosion. In addition, the certain porosity that the phosphated layer often exhibits allows a particularly good deposit accumulation or adhering of the anti-corrosion coating.

The aqueous phosphate solution preferably comprises a manganese phosphate solution in order to form a manganese phosphate layer on at least the sliding surface of the bearing ring. The phosphate solution can have a pH value between approximately 1 and approximately 3, for example, between 1.4 and approximately 1.6, and a temperature between 50° C. and approximately 100° C., for example, of approximately 75° C. to approximately 95° C. Here the ground bearing ring can remain in the solution for a time span between approximately 1 min and approximately 30 min, for example, of approximately 5 min to approximately 15 min. Here the process parameters can be set such that a phosphate layer, in particular a manganese phosphate layer, is formed that exhibits optimized properties for the adhering of the anti-corrosion coating.

As mentioned above, the manufactured plain bearing is newly built. Here it is advantageous in particular when the initial greasing is introduced into the plain bearing prior to delivery. It can thereby be ensured that an initial greasing is used that is optimally matched to the requirements of the bearing.

It is advantageous here in in particular that also prior to delivery, and preferably also prior to the introduction of the initial greasing, at least one seal is attached to the inner ring and/or outer ring, which seal covers the intermediate space between the sliding surfaces of the inner ring and of the outer ring, and is disposed such that the initial greasing is held in the intermediate space.

Further advantages and advantageous embodiments are specified in the description, the drawings, and the claims. Here in particular the combinations of features specified in the description and in the drawings are purely exemplary, so that the features can also be present individually or combined in other ways.

In the following the invention shall be described in more detail using exemplary embodiments depicted in the drawings. Here the exemplary embodiments and the combinations shown in the exemplary embodiments are purely exemplary and are not intended to define the scope of the invention. This scope is defined solely by the pending claims.

DETAILED DESCRIPTION

In the following, identical or functionally equivalent elements are designated by the same reference numbers.

Figure 1:
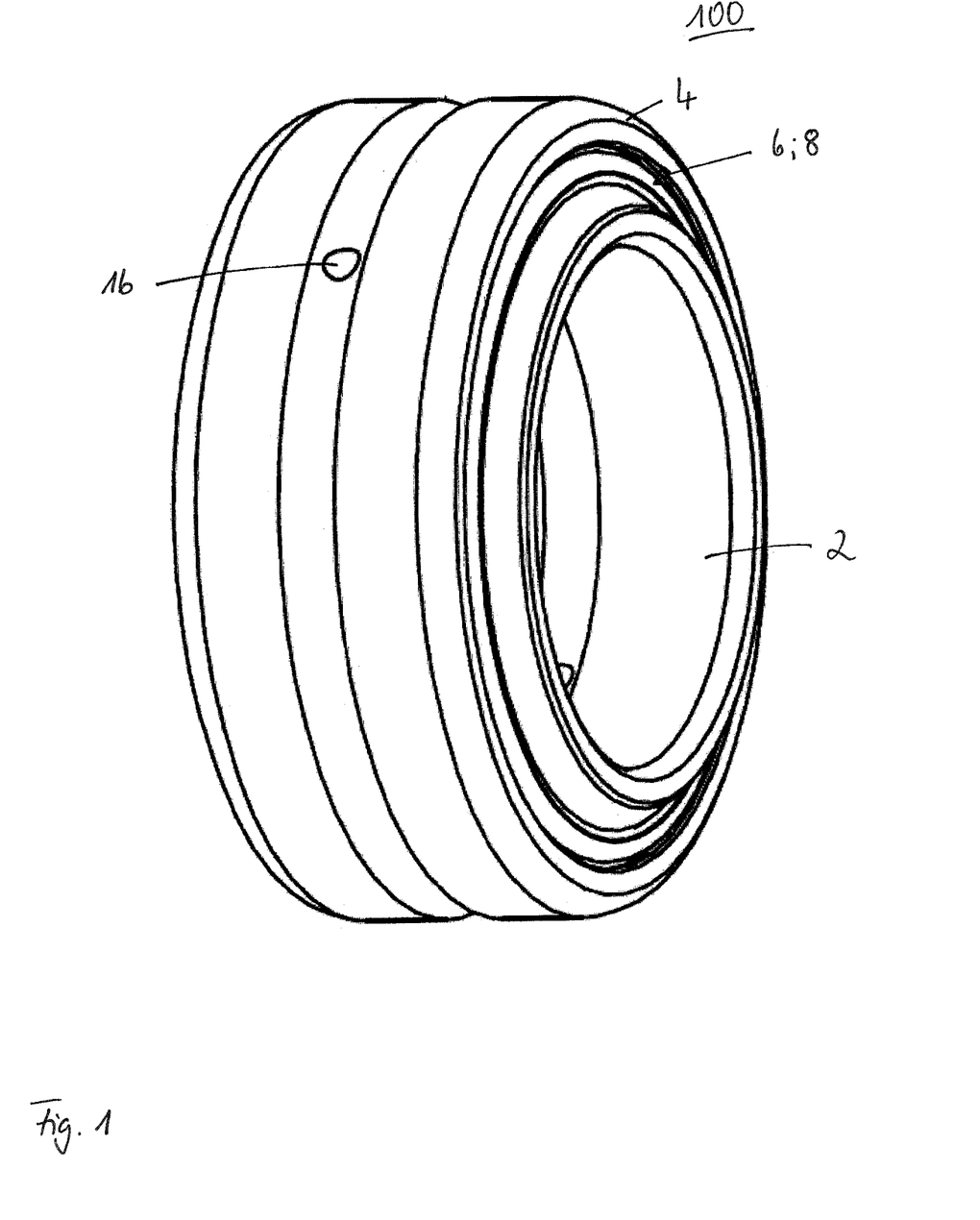
FIG. 1 is a perspective view of a plain bearing in the form of a spherical plain bearing according to one exemplary embodiment of the disclosure.
Figure 2:
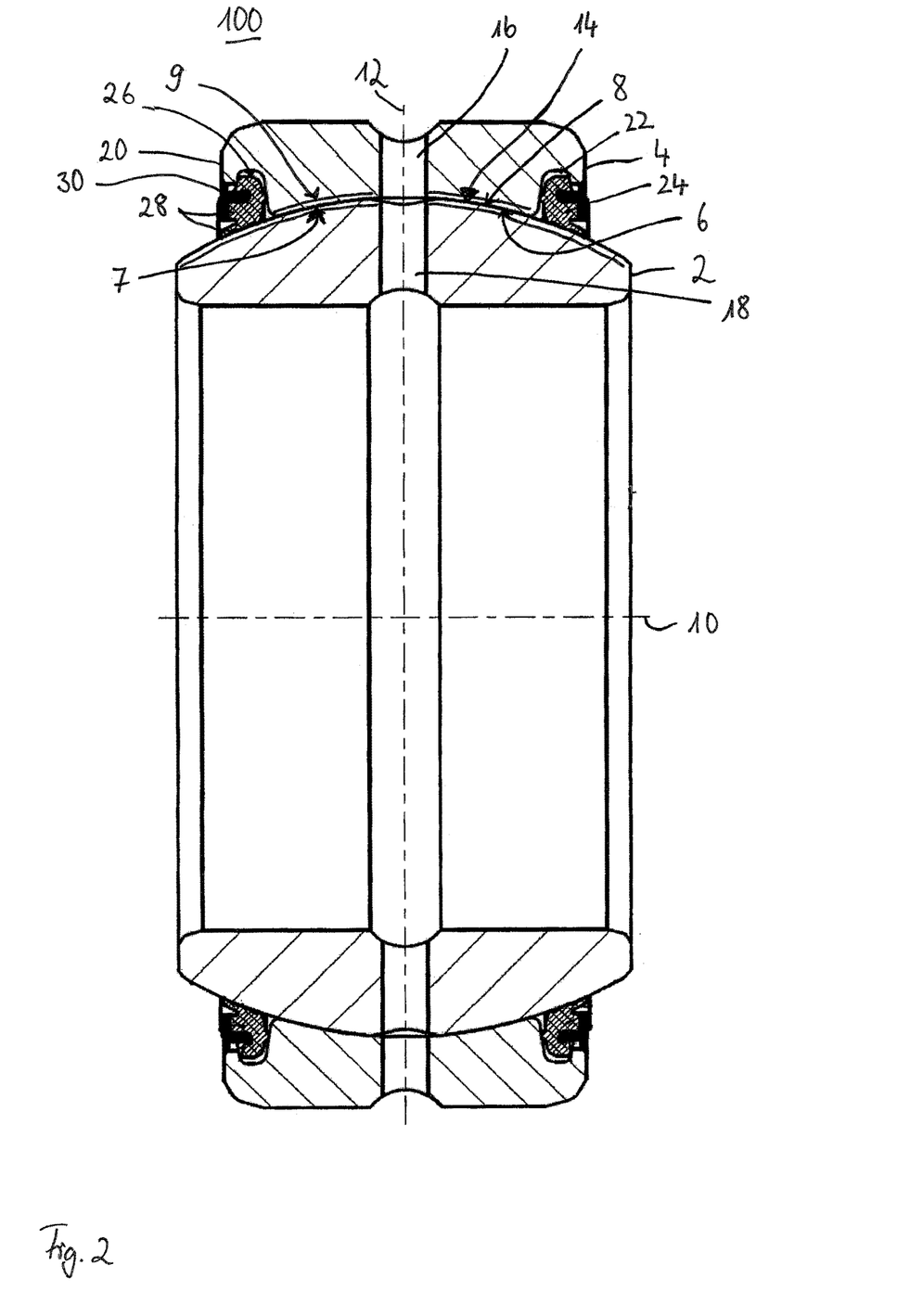
FIG. 2 is a cross-sectional view of the plain bearing of FIG. 1.

FIG. 1 shows a perspective and FIG. 2 a cross-sectional representation of a plain bearing 100 that is implemented as a spherical plain bearing, more precisely stated as a radial spherical plain bearing. The plain bearing 100 includes an inner ring 2 and an outer ring 4 that have spherically shaped outer or inner contours on which corresponding sliding surfaces 6, 8 are formed, via which the inner ring 2 and the outer ring 4 of the plain bearing 100 are movable relative to each other. This design permits both rotation of the inner ring 2 relative to the outer ring 4 about an axis 10, and a tilting or pivoting of the two bearing rings 2, 4 about an axis 12 (see FIG. 2) with respect to each other. It is thereby possible to compensate for angular displacements of a shaft (not depicted) guided by the inner ring 2 with respect to, for example, a housing (not depicted) that is connected to the outer ring 4 such that the housing and the outer ring 4 rotate together.

In summary, the inner ring 2 and the outer ring 4 are also referred to as bearing rings. They can be embodied one-part or also multi-part. Likewise, multi-row plain bearings 100 are implementable, in which a plurality of mutually adjacently disposed bearing rings are present or a bearing ring includes a plurality of sliding surfaces.

Furthermore, it is depicted schematically in FIG. 2 that the sliding surface 6 of the inner ring 2 and the sliding surface 8 of the outer ring include an anti-corrosion coating 7 and 9. After the grinding of the sliding surfaces 6, 8, the anti-corrosion coating is preferably applied to the bearing rings 2, 4 and may comprise only the sliding surfaces, but also the entire bearing ring.

However, the additional anti-corrosion coatings 7, 9 ensure that even the initially greased plain bearing 100 is protected against corrosion over its entire service life. In the exemplary embodiment depicted of FIG. 2, the anti-corrosion coating 7, 9 is an anti-friction lacquer coating including an anti-friction lacquer. The anti-friction lacquer includes a resin matrix including one or more tribologically effective additives, in particular embedded solid lubricant, wherein PTFE and/or molybdenum disulfide and/or graphite are preferably used. The embedded solid lubricant ensures optimal tribological properties, while the resin matrix seals the surface of the anti-friction coating 6, 8 and thus contributes to an increase of the corrosion protection.

Alternatively the anti-corrosion coating 7, 9 comprises a chemical nickel layer, in particular a nickel-phosphorus layer, and/or a polymer coating, in particular a coating including polyether ether ketone (PEEK), polyether sulfone (PES), polyphenylene sulfide (PPS), polyimide (PI), polyamide-imide (PAI), polybenzimidazole (PBI), and/or PTFE. These anti-corrosion coatings 7, 9 are also sufficiently hard and wear-resistant in order to ensure, in combination with the initial greasing, an optimized corrosion protection, and simultaneously that the tribological properties of the plain bearing 100 are not reduced.

A further increase of the corrosion protection, a friction reduction, and/or a wear reduction can be achieved by the inner ring 2 and/or the outer ring 4 at least partially including a phosphate layer (not shown), in particular a manganese phosphate layer. For this purpose the sliding surface 6, 8 is phosphated by subjecting the sliding surface 6, 8 to an aqueous phosphate solution, for example, by an immersion, a spraying, a coating, and/or a flooding of the sliding surface 6, 8 or of the associated bearing ring 2, 4. In addition, a certain porosity generated by the phosphating, an accumulating or adhering of the anti-corrosion coating 7, 9, in particular of the anti-friction lacquer, can be improved.

During operation the sliding surface 6 of the inner ring 2 and the sliding surface 8 of the outer ring 4 have a spacing from each other that on average falls in the range of a few tenths of a millimeter, i.e., for example, in the range of 0.01 mm and approximately 1 mm. Of course, in some embodiments a smaller or also a larger spacing of the corresponding sliding surfaces 6, 8 from each other can also be present. Due to the spacing of the sliding surfaces 6, 8, an intermediate space 14 is formed that in the depicted bearing 100 is filled with an initial greasing (not depicted) in order to ensure low-friction movement even with the loads occurring in a spherical plain bearing.

In order to introduce the initial greasing into the bearing, the depicted plain bearing 100 includes one or more bores 16 in the region of the outer ring 4, and optionally bores 18 in the inner ring 2, via which the initial greasing is introduced during manufacturing. Depending on the specific implementation of a corresponding plain bearing 100, the bores 16, 18 can also be sealed after the initial greasing.

Furthermore, FIGS. 1 and 2 show that the outer ring 4 includes an end surface 20 along the axis 10 and perpendicular thereto on both sides. In each of end surfaces 20, openings 22 are formed in which seals 24 are received in order to seal the intermediate region 14 or intermediate space between the inner ring 2 and the outer ring 4. The openings 22 furthermore include an undercut 26 that is configured such that the seal 24 is connected to the outer ring 4 such that they essentially rotate together and that the seal 24 abuts against the inner ring 2 by seal lips 28.

Of course, connection techniques other than those described above can also be used in other exemplary embodiments. Thus, for example, a different friction-fit, an interference-fit, or a material-bonded connection technique can also be chosen. Thus, for example, a corresponding seal can also be adhered to the outer ring 4.

The seals 14 preferably have an elastomer structure that forms the three seal lips 28 oriented essentially parallel or essentially radially to a common center point. Here the elastomer structures include an elastomer, for example, nitrile rubber (such as NBR=nitrile butadiene rubber), however, they can optionally also be manufactured from other materials.

In addition, the seals 24 may each include at least one stiffening structure 30 that is mechanically connected to the elastomer structure. This mechanical connection can be effected, for example, on the basis of a friction-fit, interference-fit, and/or material-bonded connection technique.

Of course, the seals 14 can also be fixed against the inner ring 2, and abut against the outer ring 4.

Figure 3:
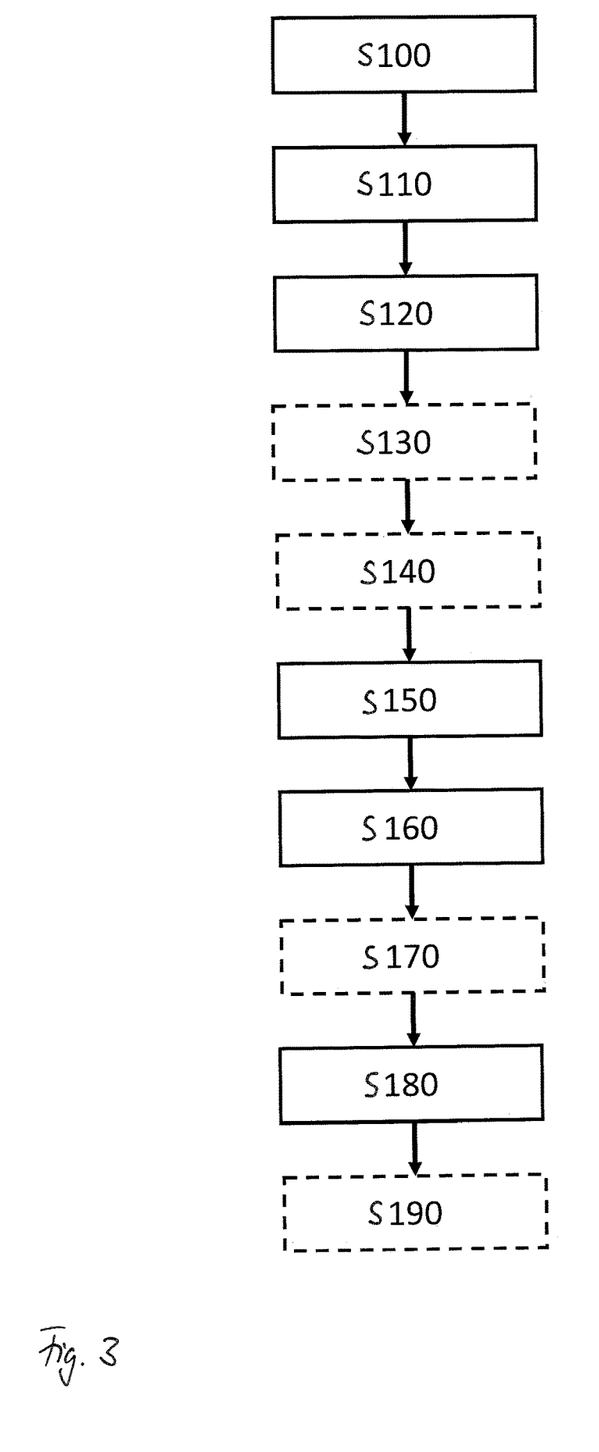
FIG. 3 is a flow diagram of an exemplary method for manufacturing the plain bearing of FIG. 1.

FIG. 3 shows a flow diagram of an exemplary embodiment of a method for manufacturing an above-described plain bearing 100.

First, in a step S100 at least one blank made of a starting material is provided for the inner ring 2 and the outer ring 4. The providing S100 can, for example, comprise a rotating, a milling, or another machining production of the at least one blank made of at least one material piece of the starting material.

In a step S110 the at least one bearing ring is then heat-treated before it is ground during a step S120 in order to form the at least one sliding surface 6 of the inner ring 2 and the at least one sliding surface 8 of the outer ring 4 in a preliminary stage. In an optional step S130 the at least one sliding surface 6, 8 can then be honed or cross-ground in the preliminary stage.

In a further optional step S140, the at least one honed or cross-ground sliding surface 6, 8 can then be phosphated, before in a step S150 an anti-corrosion coating is applied onto the sliding surface. Here the phosphating makes possible a particularly good adhering of an anti-friction lacquer that is used as an anti-corrosion coating. However, if for corrosion protection the ground sliding surface is chemically nickel-plated, or covered with a polymer, a previous phosphating can be omitted.

In step S160 the inner ring 2 and the outer ring 4 are assembled in order to obtain the plain bearing 100.

In an optional step S170 at least one seal 24 is then attached to the assembled plain bearing in order to seal the intermediate space 14 between the at least one sliding surface 6 of the inner ring 2, and the at least one sliding surface 8 of the outer ring 4.

In a final step S180 an initial greasing is introduced into the intermediate region 14 of the plain bearing 100.

In an optional step S190 the inner ring 2 and/or the outer ring 4 of the plain bearing 100 can be labelled prior to packaging of the plain bearing. This can be effected, for example, by laser labeling, punching, printing, stamping, or another labeling and marking method.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved plain bearings.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

REFERENCE NUMBER LIST

100 Plain bearing
2 Inner ring
4 Outer ring
6, 8 Sliding surface
7, 9 Anti-corrosion coating
10, 12 Axis
14 Intermediate space
16, 18 Bore for initial greasing
20 End surface
22 Opening
24 Seal
26 Undercut 28 Seal lip
30 Reinforcing element

What is claimed is:

1. A newly built plain bearing comprising:
an inner ring, and
an outer ring,
wherein the inner ring and the outer ring each include a sliding surface along which the inner ring and the outer ring are movable relative to each other,
wherein an intermediate space exists between the sliding surface of the inner ring and the sliding surface of the outer ring,
wherein an initial greasing is provided in the intermediate space,
wherein at least one of the sliding surfaces includes an anti-corrosion coating, and
wherein the anti-corrosion coating includes polyether ether ketone (PEEK), polyether sulfone (PES), polyphenylene sulfide (PPS), polyimide (PI), polyamide-imide (PAI), polybenzimidazole (PBI), or PTFE.

2. The plain bearing according to claim 1 configured as a spherical plain bearing.

3. The spherical plain bearing according to claim 2, wherein the anti-corrosion coating is an anti-friction lacquer coating.

4. The spherical plain bearing according to claim 3, wherein the anti-friction lacquer coating includes an embedded solid lubricant, and
wherein the solid lubricant comprises PTFE or molybdenum disulfide or graphite.

5. The spherical plain bearing according to claim 2, wherein the initial greasing is introduced ex works.

6. The spherical plain bearing according to claim 2, wherein the initial greasing includes a grease paste including a white solid lubricant having an overall proportion of between 5% by weight and 40% by weight, and
wherein the white solid lubricant is a phosphate, diphosphate, hydroxide, or borate of a metallic element, zinc calcium, or a zinc-calcium compound, or the grease paste includes a synthetic oil, or the grease paste is a solid paste of NLGI consistency class 2 according to DIN 51818:1981.12.

7. The spherical plain bearing according to claim 2, wherein the inner ring and/or the outer ring at least partially includes a manganese phosphate layer.

8. The spherical plain bearing according to claim 2, further including at least one seal covering the intermediate space between the sliding surfaces of the inner ring and of the outer ring and disposed such that the initial greasing is held in the intermediate space.

9. The plain bearing according to claim 1, wherein the inner ring comprise an unused inner ring and wherein the outer ring comprises an unused outer ring.

10. A spherical plain bearing comprising:
an inner ring, and
an outer ring,
wherein the inner ring and the outer ring each include a sliding surface along which the inner ring and the outer ring are movable relative to each other,
wherein an intermediate space exists between the sliding surface of the inner ring and the sliding surface of the outer ring,
wherein an initial greasing is provided in the intermediate space, and
wherein at least one of the sliding surfaces includes an anti-corrosion coating,
wherein the anti-corrosion coating is a nickel-phosphorus layer, or a coating including polyether ether ketone (PEEK), polyether sulfone (PES), polyphenylene sulfide (PPS), polyimide (PI), polyamide-imide (PAI), polybenzimidazole (PBI), or PTFE.

11. A method for manufacturing a newly built plain bearing comprising:
providing an inner ring;
providing an outer ring;
grinding the inner ring to form a sliding surface on the inner ring,
grinding the outer ring to form a sliding surface on the outer ring,
applying an anti-corrosion coating onto the sliding surface of the inner ring and the sliding surface of the outer ring,
after applying the anti-corrosion coating, assembling the inner ring inside the outer ring, such that an intermediate space remains between the sliding surface of the inner ring and the sliding surface of the outer ring,
before operating the bearing under load for a first time, introducing greasing into the intermediate space,
wherein the anti-corrosion coating is a nickel-phosphorus layer, or a coating including polyether ether ketone (PEEK), polyether sulfone (PES), polyphenylene sulfide (PPS), polyimide polyamide-imide (PAI), polybenzimidazole (PBI), or PTFE.

12. The method according to claim 11, including operating the bearing under load for the first time after introducing the greasing.

13. The method according to claim 11, including, before operating the bearing under load for the first time, applying at least one seal to the inner ring and/or to the outer ring to seal the intermediate space and hold the initial greasing in the intermediate space.

14. A method according to claim 11, including, before applying of the anti-corrosion coating, treating the inner ring and/or the outer ring with a phosphate solution.

15. The method according to claim 14, wherein the phosphate solution is a manganese phosphate solution.

16. The method according to claim 15,
wherein the anti-corrosion coating includes polyether ether ketone (PEEK), polyether sulfone (PES), polyphenylene sulfide (PPS), polyimide (PI), polyamide-imide (PAI), polybenzimidazole (PBI), or PTFE.

17. The method according to claim 11,
wherein the anti-corrosion coating includes polyether ether ketone (PEEK), polyether sulfone (PES), polyphenylene sulfide (PPS), polyimide (PI), polyamide-imide (PAI), polybenzimidazole (PBI), or PTFE.

18. The method according to claim 17,
wherein the plain bearing is configured as a spherical plain bearing.

* * * * *